United States Patent [19]

Data

[11] Patent Number: 5,783,787
[45] Date of Patent: Jul. 21, 1998

[54] ELECTRICAL SWITCH ASSEMBLY

[75] Inventor: Mark M. Data, Bolingbrook, Ill.

[73] Assignee: Molex Incorporated, Lisle, Ill.

[21] Appl. No.: 748,248

[22] Filed: Nov. 12, 1996

[51] Int. Cl.$^6$ .................................................. H01H 13/70
[52] U.S. Cl. ........................ 200/5 R; 200/5 A; 200/339
[58] Field of Search ................................. 200/1 R, 1 B,
200/5 R, 5 A, 6 A, 292, 293–307, 315,
339, 512–517, 553, 557, 6 R

[56] References Cited

U.S. PATENT DOCUMENTS

| | | | |
|---|---|---|---|
| 4,132,873 | 1/1979 | Vanderpoel | 200/6 R |
| 4,389,552 | 6/1983 | Sorenson | 200/241 X |
| 4,429,200 | 1/1984 | Glenn et al. | 200/332.1 |
| 4,536,625 | 8/1985 | Bebie | 200/5 A |
| 4,687,200 | 8/1987 | Shirai | 200/5 A X |
| 4,710,602 | 12/1987 | Baity et al. | 200/315 |
| 4,929,804 | 5/1990 | Kawai et al. | 200/5 A |
| 4,975,547 | 12/1990 | Nakayama et al. | 200/5 R |
| 5,089,677 | 2/1992 | Satou | 200/339 |
| 5,115,108 | 5/1992 | Ogawa et al. | 200/1 B |
| 5,213,204 | 5/1993 | Sommer | 200/303 |
| 5,412,169 | 5/1995 | Comerci et al. | 200/339 |
| 5,448,028 | 9/1995 | Filion et al. | 200/52 R |
| 5,498,843 | 3/1996 | Date et al. | 200/6 A |

*Primary Examiner*—J. R. Scott
*Attorney, Agent, or Firm*—A. A. Tirva

[57] ABSTRACT

An electrical switch assembly includes a printed circuit board having a planar switch pad thereon. An actuator is mounted for pivotal movement relative to the printed circuit board about a pivot axis spaced to one side of the planar switch pad. A planar switch contact on the actuator overlies the planar switch pad on the circuit board. The planar switch contact is disposed at a predetermined angle to the planar switch pad when out of engagement therewith in an inactive condition of the actuator, so that the entire surface of the switch contact engages the entire surface of the switch pad immediately upon initial engagement.

3 Claims, 5 Drawing Sheets

ELECTRICAL SWITCH ASSEMBLY

FIELD OF THE INVENTION

This invention generally relates to the art of electrical switches and, particularly, to a rocker or pivoting-type switch assembly for actuating planar switch pads on a printed circuit board.

BACKGROUND OF THE INVENTION

Rocker or pivoting-type switches are used in a variety of applications for actuating switches of a switching unit. A rocker-type electrical switch assembly generally includes a pivoted actuator pivotally mounted about a rotational axis located between a pair of switches, with wing portions of the actuator projecting from opposite sides of the axis and overlying the switches.

Rocker or pivoting-type switches of the character described above include switches of the elastomeric dome variety which are convenient to use in arrays which are easy to assemble to multiple switching panels. Such switches are readily secured to printed circuit boards. The switch actuators may include planar switch contacts for engaging planar switch pads on the circuit board.

One of the problems with rocker or pivoting-type switches when used on printed circuit boards involves the inefficient and/or ineffective engagement of the planar switch contacts on the pivoting actuator and the planar switch pads on the circuit board. Specifically, since the switch contacts on the pivoting actuator are planar and the switch pads on the printed circuit board are planar, a problem with prior designs has been that the planar elements do not come into contact with each other over the entire engaging surfaces of the contacts and pads. This, of course, is due to the pivoting or angular movement of the actuator and its switch contacts. Typically, an edge of the planar switch contact first engages the planar switch pad on the printed circuit board, and the entire planar switch contact engages the entire switch pad only when sufficient, often excessive pressure is applied to the actuator.

The present invention is directed to solving the above problems in the prior art by orienting the switch contacts at a predetermined angle so that the switch contacts "close" this angle when the actuator is pivoted and, thereby, the entire surface of the planar switch contact engages the entire surface of the planar switch pad immediately upon initial engagement.

SUMMARY OF THE INVENTION

An object, therefore, of the invention is to provide a new and improved rocker or pivoting-type electrical switch assembly.

In the exemplary embodiment of the invention, the switch assembly includes a printed circuit board having a pair of spaced planar switch pads thereon. A rocker actuator is mounted above the printed circuit board and is rockably movable relative thereto about a rotational axis located between the spaced switch pads, with wing portions of the actuator disposed on opposite sides of the rotational axis. A pair of planar switch contacts are provided on the wing portions of the actuator overlying the planar switch pads on the printed circuit board. The planar switch contacts are disposed at predetermined angles to the planar switch pads when out of engagement therewith in an inactive condition of the actuator, such that the planar switch contacts move about the rotational axis into engagement with the planar switch pads to effect initial and immediate mutually planar abutment therewith.

As disclosed herein, the rocker actuator is fabricated of elastomeric material and is mounted to the printed circuit board by means of an integral peripheral flexible skirt. The elastomeric material allows one of the wing portions of the rocker actuator, along with its respective planar switch contact, to move toward the respective planar switch pad on the circuit board independent of the other wing portion of the actuator.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
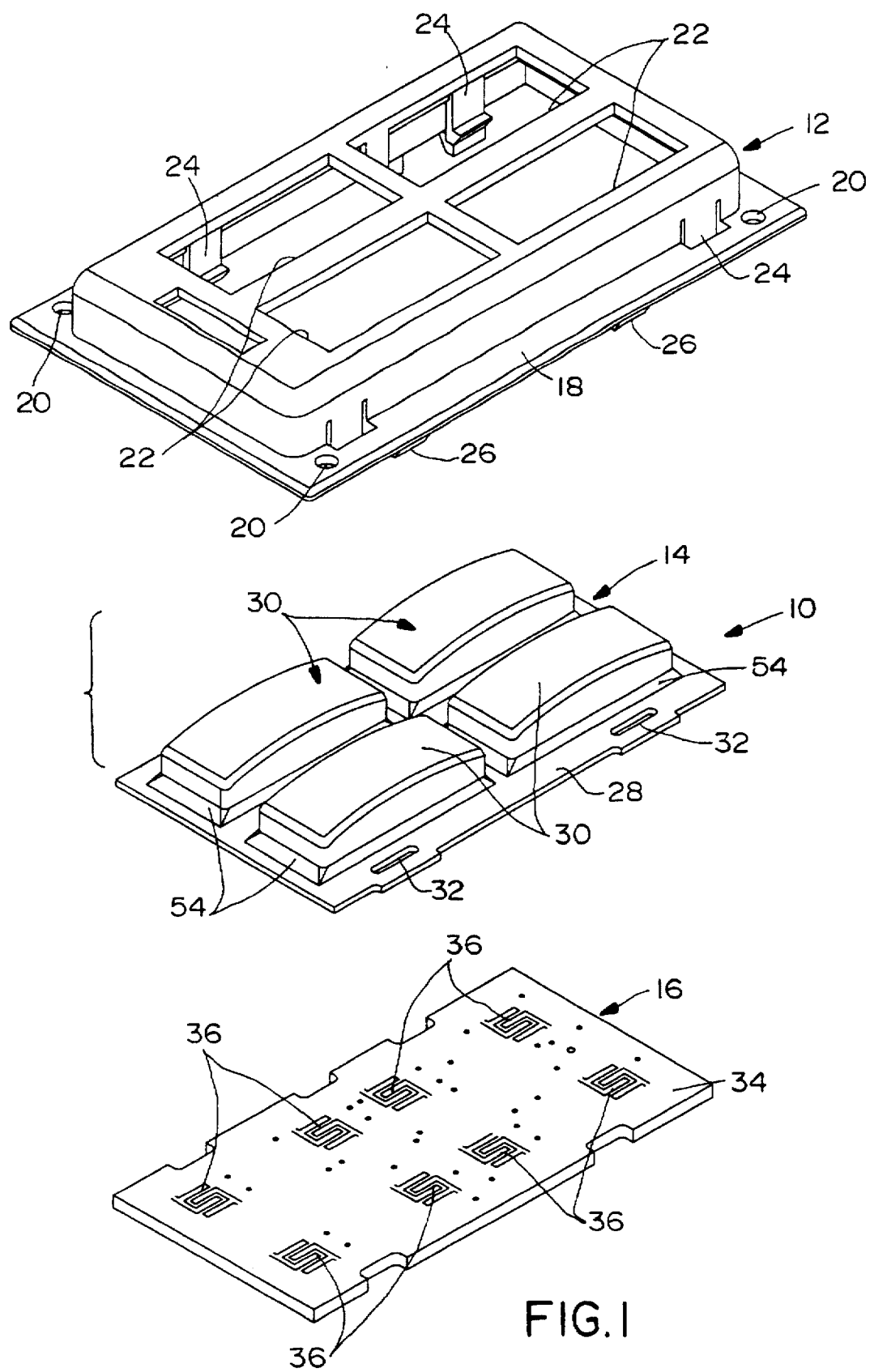
FIG. 1 is an exploded perspective view of the components of a printed circuit board subassembly appropriate for use with the concepts of the invention.

Referring to the drawings in greater detail, and first to FIG. 1, an electrical switch assembly or printed circuit board subassembly, generally designated 10, includes a front housing, generally designated 12; a 4-button switch actuator pad, generally designated 14; and a switch printed circuit board, generally designated 16.

More particularly, front housing 12 of printed circuit board subassembly 10 is a unitary structure integrally molded of fairly rigid plastic material. The housing includes a peripheral flange 18 having attaching holes 20 near the corners thereof. The remainder of the housing is raised above peripheral flange 14 and defines four elongated or rectangular push button apertures 22. A pair of inwardly directed hooked latches 24 project downwardly from each side of the housing immediately inside the outer edges of apertures 22. A pair of outwardly directed hooked latches 26 depend downwardly from peripheral flange 18 of the housing.

The 4-button switch actuator pad 14 of printed circuit board subassembly 10 is a unitary structure molded of elastomeric material (i.e. considerably softer or more flexible than the molded plastic material of front housing 12). Actuator pad 14 includes a peripheral flange 28, with four rocker actuators, generally designated 30, projecting upwardly therefrom. In assembly, rocker actuators 30 project upwardly through apertures 22 in front housing 12. Peripheral flange 28 of actuator pad 14 include slots 32 through which inwardly directed hooked latches 24 of front housing 12 project.

Switch printed circuit board 16 of printed circuit board subassembly 10 includes a generally planar substrate 34 having a plurality of planar switch pads 36 on the upper surface thereof. It can be seen that there are eight planar switch pads 36 which define four pairs of the pads for respective actuation by the four rocker actuators 30 of actuator pad 14. In FIG. 1, planar switch pads 36 are shown as a planar array of circuit traces in a particular electrical configuration. However, the planar switch pads can take a wide variety of configurations, including a flat foil pad being divided by an open slit to define a pair of closable contacts within the planar switch pad, as is known in the art.

Figure 2:
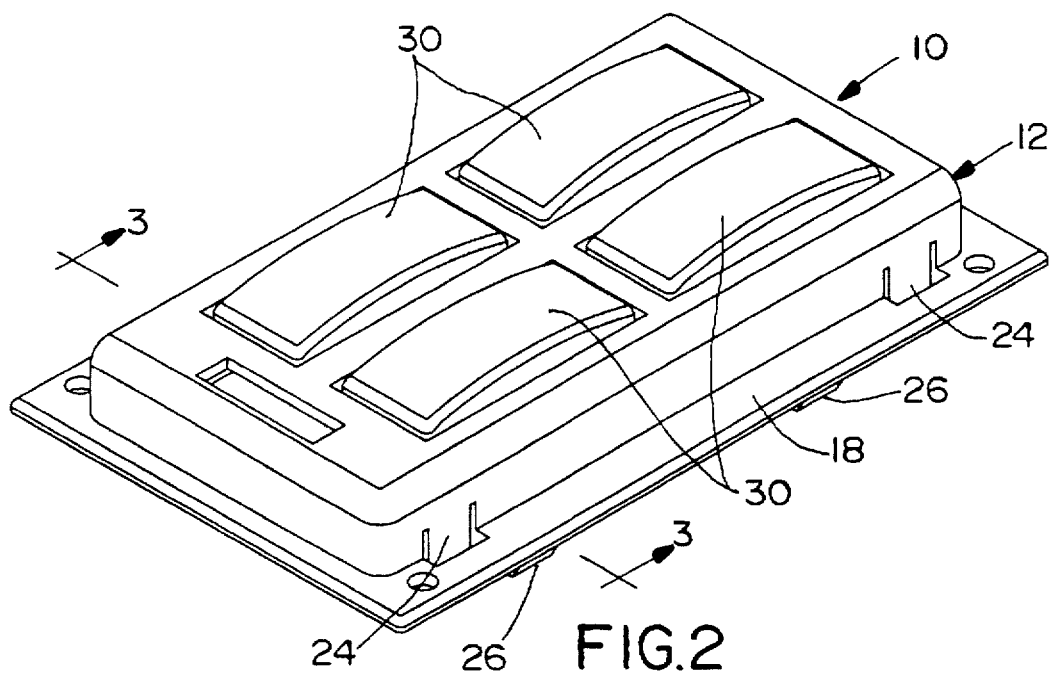
FIG. 2 is a perspective view of the printed circuit board subassembly in assembled condition.
Figure 3:
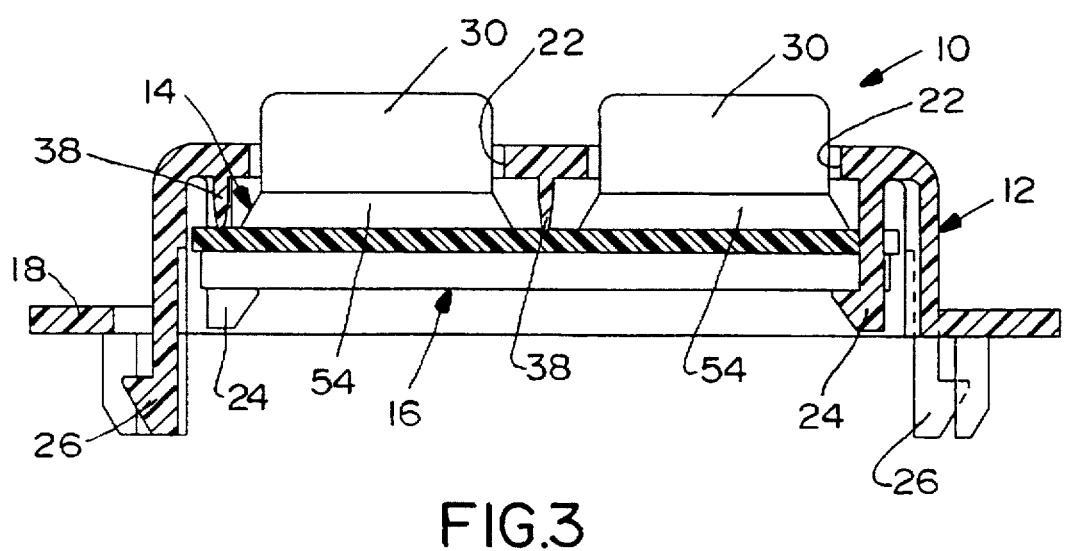
FIG. 3 is a vertical section, on an enlarged scale, taken generally along line 3—3 of FIG. 2.

FIGS. 2 and 3 show the components (FIG. 1) of printed circuit board subassembly 10 in assembled condition. As best seen in FIG. 3, 4-button switch actuator pad 14 is located beneath front housing 12 with rocker actuators 30 projecting upwardly through push button apertures 22 in the housing. Switch printed circuit board 16 is pushed upwardly beneath the actuator pad until the printed circuit board snaps into latching engagement with inwardly directed hooked latches 24, thereby supporting the actuator pad, while interior flanges 38 on the inside of housing 12 hold the actuator pad downwardly against the printed circuit board. FIG. 3 also shows more clearly the size and configuration of outwardly directed hooked latches 26 depending from the underside of front housing 12, for purposes described below.

Figure 4:
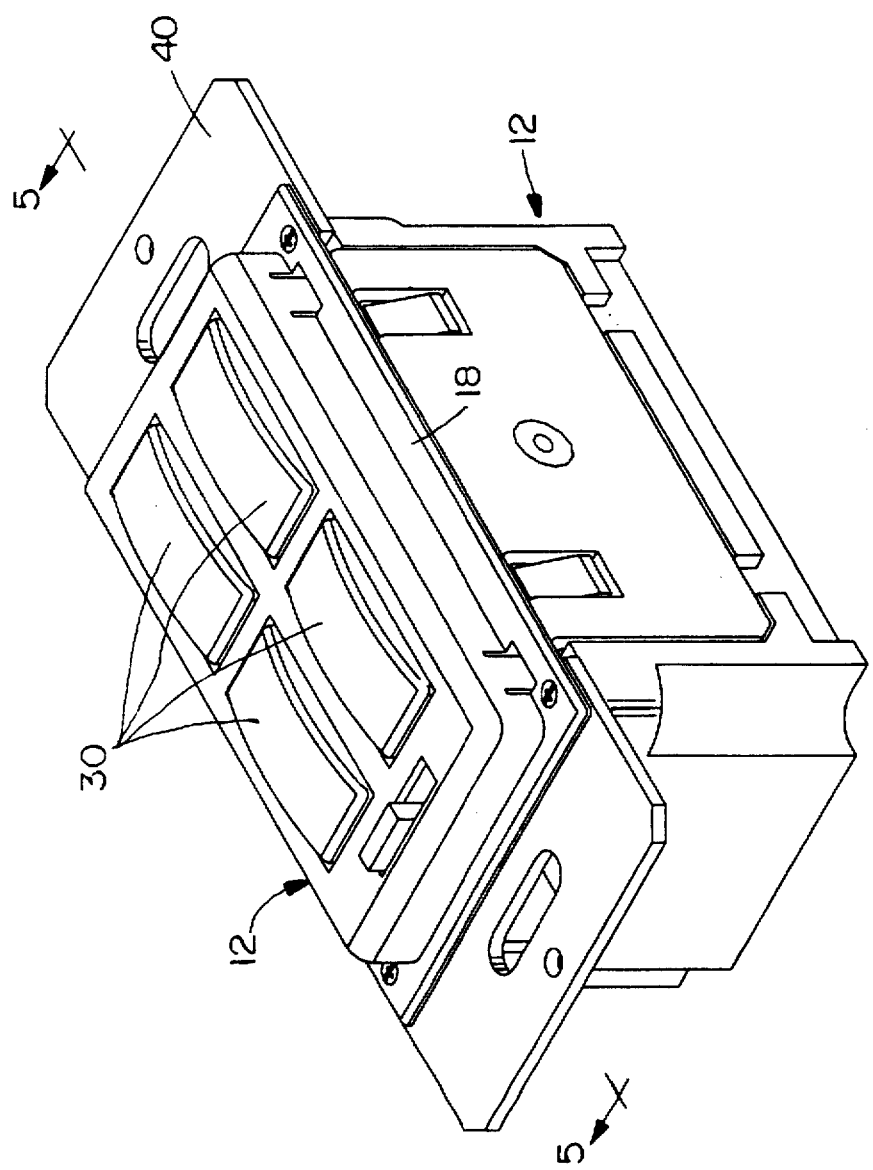
FIG. 4 is a perspective view of the printed circuit board subassembly mounted to the front plate of a rear wiring module.
Figure 5:
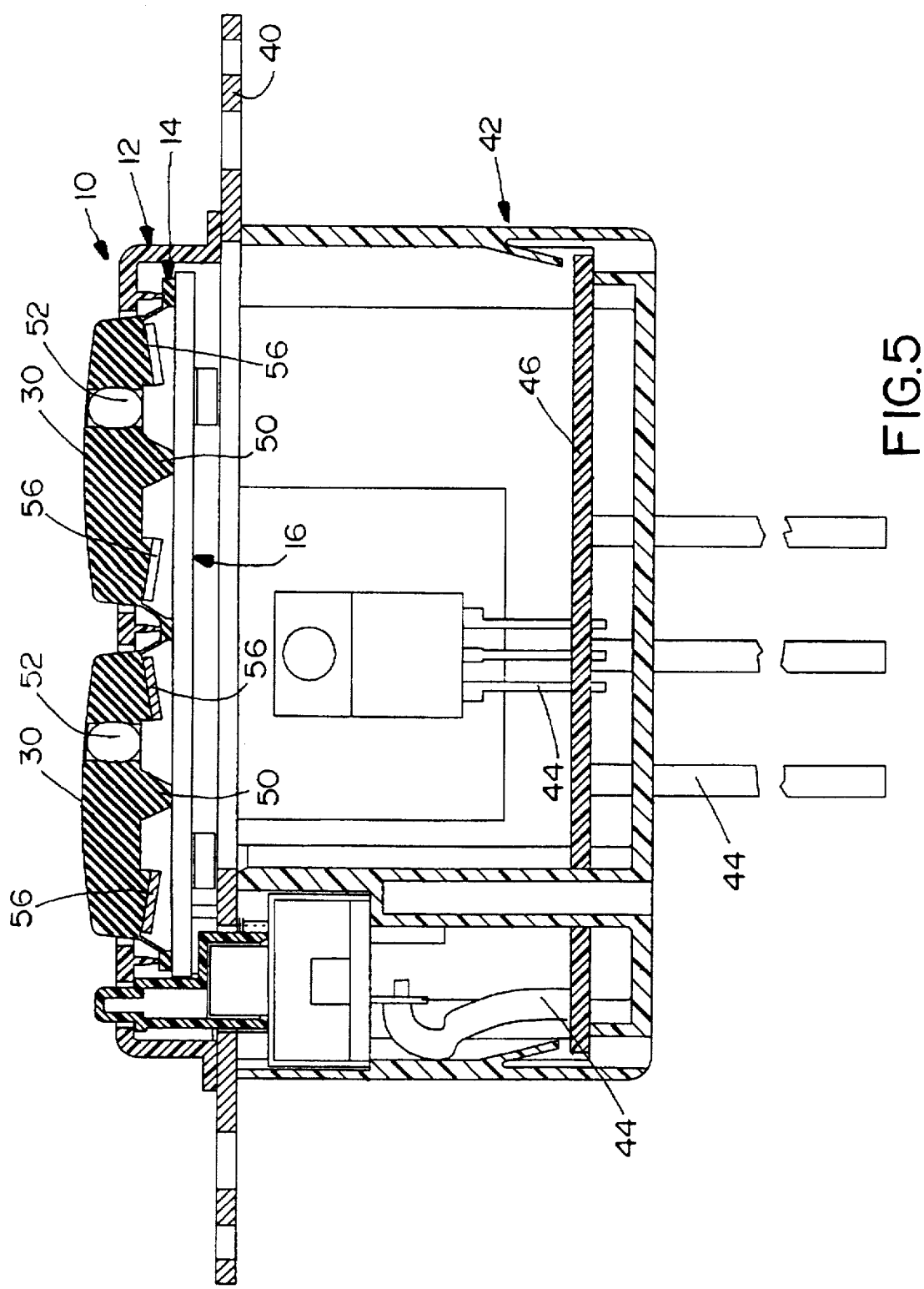
FIG. 5 is a vertical section taken generally along line 5—5 of FIG. 4.

FIGS. 4 and 5 show electrical switch assembly or printed circuit board subassembly 10 mounted on top of a front plate 40 of a rear wiring module or box, generally designated 42. The rear module will not be described in any detail herein because is can take a myriad of electrical designs. Suffice it to say, the rear module houses or mounts various wires and terminals 44, along with an interior substrate or circuit board 46. The rear module defines the eventual functions effected by the electrical switch assembly 10 of the invention.

Figure 6:
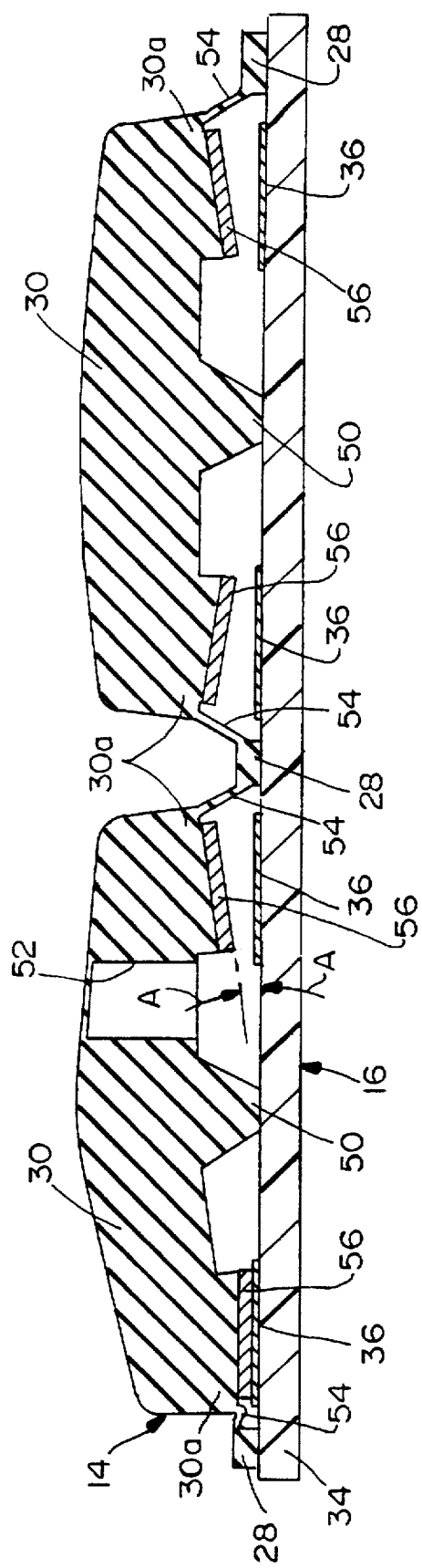
FIG. 6 is an enlarged vertical section through the switch actuator pad disposed above the printed circuit board.

FIG. 6 more clearly shows the array of planar switch pads 36 on substrate 34 of switch printed circuit board 16, in conjunction with 4-button switch actuator pad 14 and rocker actuators 30. Each rocker actuator 30 is mounted above printed circuit board 16 and is rockably movable relative thereto about a rotational axis defined by a center fulcrum 50. The assembly is oriented so that the rotational axis 50 is located between the spaced switch pads 36 of one of the pairs thereof on the printed circuit board. Each rocker actuator 30 has wing portions 30a disposed on opposite sides of rotational axis 50. One or more of the wing portions may include a light-receiving cavity 52 which is not germane to the gist of the invention herein. It can be seen in FIG. 6 that each rocker actuator 30 is joined to peripheral flange 28 by a peripheral flexible skirt 54 within the unitary structure of the entire actuator pad, keeping in mind that the actuator pad is fabricated of elastomeric material.

Still referring to FIG. 6 in conjunction with FIG. 5, a pair of planar switch contacts 56 are disposed on the underside of wing portions 30a of each rocker actuator 30 overlying the planar switch pads 36 in the respective pair thereof on printed circuit board 16. Planar switch contacts 56 are disposed at predetermined angles to planar switch pads 36 when out of engagement therewith in the inactive condition of the actuator such that the planar switch contacts move about the respective rotational axis 50 into engagement with the planar switch pads to effect initial and immediate mutual planar abutment therewith.

More particularly, both switch contacts 56 of the right-hand actuator 30 in FIG. 6, along with the right-hand switch contact 56 of the left-hand actuator 30 in FIG. 6, are shown out of engagement with their respective planar switch pads 36 on printed circuit board 16. It has been determined that with the structure, dimensions, spacing, location of fulcrum/axis 50 and other parameters of the electrical switch assembly 10 that this angle be on the order of 9°, as indicated by arrows "A" in FIG. 6.

With the predetermined angle between switch contacts 56 and switch pads 36 as described above, any respective switch contact 56 will "close" this angle when the rocker actuator is pivoted (as indicated by the left-hand switch contact 56 in FIG. 6) and, thereby, the entire surface of planar switch contact 56 will engage the entire surface of planar switch pad 36 immediately upon initial engagement. This eliminates the problem of the prior art wherein an edge of a switch contact will first engage the switch pad on the board, and the entire switch contact will only engage the entire switch pad when sufficient pressure, often excessive pressure, is applied to the actuator.

Lastly, the actuation of the left-hand switch contact 56 of the left-hand rocker actuator 30 in FIG. 6 shows that, with the rocker actuator being fabricated of elastomeric material, one of the wings 30a of any rocker actuator can move toward its respective switch pad 36 independent of the other wing portion of the actuator. Of course, it must be understood that this is afforded simply because of the elastomeric nature of the material of the actuator. The concepts of the invention are equally applicable with rigid actuators of the rocker or pivoted-type wherein the actuators rock about their rotational axes in a "see-saw" manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An electrical switch assembly, comprising:

a printed circuit board having a pair of spaced planar switch pads thereon;

a rocker actuator fabricated of elastomeric material including an integral peripheral flange joined together by a peripheral flexible skirt, a fulcrum, and wing portions disposed on opposite sides of the fulcrum;

the actuator mounted above the printed circuit board by the peripheral flange held to the printed circuit board with the fulcrum in contact with the printed circuit board where the flange and fulcrum are adapted to allow the actuator limited rockable movement about the fulcrum between the spaced switch pads;

a planar switch contact on each wing portion of the actuator overlying the planar switch pads on the printed circuit board, the planar switch contacts being disposed at predetermined angles to the planar switch pads when out of engagement therewith in an inactive condition of the actuator such that the planar switch contacts move about the fulcrum into engagement with the planar switch pads to effect initial and immediate mutually planar abutment therewith one of said wing portions of the rocker actuator, alone with its respective planar switch contact, adapted to move toward the respective planar switch pad independent of the other wing portion of the actuator.

2. The electrical switch assembly of claim 1 wherein said flexible skirt is in tension when the actuator is in an active condition so that the rockable movement of the actuator about the fulcrum is limited insuring that one of said wing portions of the actuator can move independent of the other wing portion.

3. The electrical switch assembly of claim 2 wherein the portion of the fulcrum in contact with the printed circuit board is flat further insuring that one of said wing portions of the actuator can move independent of the other wing portion.

* * * * *